United States Patent [19]

Rabideau

[11] Patent Number: 4,796,379

[45] Date of Patent: Jan. 10, 1989

[54] DIVING PLUG FISH LURE

[76] Inventor: Phillip A. Rabideau, 3605 Fawn Creek Path, Austin, Tex. 78746

[21] Appl. No.: 80,223

[22] Filed: Jul. 24, 1987

Related U.S. Application Data

[63] Continuation-in-part of Ser. No. 884,723, Jul. 11, 1986, abandoned.

[51] Int. Cl.[4] .............................................. A01K 85/00
[52] U.S. Cl. ..................................................... 43/42.48
[58] Field of Search .............................. 43/42.48, 42.45

[56] References Cited

U.S. PATENT DOCUMENTS

| | | | |
|---|---|---|---|
| 1,268,635 | 6/1918 | Shaff | 43/42.48 |
| 1,489,043 | 4/1924 | Reinewald | 43/42.48 |
| 1,592,139 | 7/1926 | Hennings | 43/42.48 |
| 1,636,832 | 7/1927 | Pagin | 43/42.48 |
| 2,184,031 | 12/1939 | Wyatt | 43/42.48 |
| 2,198,043 | 4/1940 | Scogland et al. | 43/42.48 |
| 2,743,545 | 5/1956 | Seneker | 43/42.48 |
| 2,788,604 | 4/1957 | Sleight | 43/42.48 |
| 3,162,971 | 12/1964 | Gilliam | 43/42.48 |
| 3,426,467 | 2/1969 | Bryant | 43/42.48 |

Primary Examiner—M. Jordan
Attorney, Agent, or Firm—John N. Shaffer, Jr.

[57] ABSTRACT

An artificial "plug" or "crankbait" fishing lure that once cast, or placed in the water, dives unaided (without applying line force) vertically to the lake or river bottom or until retrieved. As it dives it wobbles in a fish attracting manner (e.g. as if it were a wounded bait fish). Once on the bottom it comes to rest with its treble hook supported well off the bottom, to avoid snagging. When retrieved by reeling in, it exhibits a fish-attracting wobble. The lure has unlimited operating depth. Once in the water the lure can reach any depth by letting it dive vertically on a slack (no tension) line to the desired depth and then retrieving it by manipulating the fishing rod in conjunction with the reeling speed. The lure can be bounced along the bottom during the retrieve or kept swimming in open water. A retrieval mode commonly called "jigging" by fishermen (making a saw-tooth path by alternate lure dives and reel cranking while manipulating the rod tip) can effectively be achieved.

6 Claims, 2 Drawing Sheets

DIVING PLUG FISH LURE

This application is a continuation-in-part of application Ser. No. 884,723 filed July 11, 1986 now abandoned.

BACKGROUND OF THE INVENTION

The recreational or sport fisherman has available a wide variety of artificial fish lures that can be employed to attract and catch fish. One common family of lures is known as "plugs" or "crankbaits" (a "plug" that is "cranked-in" by the fisherman operating a fishing rod and reel). They are generally designed to imitate the appearance and motions of normal fish forage, e.g. bait fish, crayfish, salamander, etc. They are usually cast or trolled with rod and reel. They float, sink or have neutral buoyancy. The body of such lures is usually made of wood, hollow injection molded plastic or plastic foam material. The lure action and depth is generally controlled by some angular surface and/or diving plate at the front of the lure in conjunction with the administered retrieval speed. In the case of many so-called diving plugs their operating depth has a definite limit. This limit depends upon a lure's geometry and the resultant downward pulling force produced by the line, its length, and the resultant diving plane angle, Also, when the retrieval force is removed from a plug it floats, stays in a nuetral position, or drops haphazardly. Generally, the "plug" is pulled-down (a propelled descent) to the operating depth and a wobbling motion is generated by the pulling force in the fishing line.

SUMMARY OF THE INVENTION

Accordingly, it is the object of this invention to provide an artificial fishing lure of the "plug" and "crankbait" family that exhibits several exceptional properties:

A lure that will dive head first vertically unaided (without line tension), and while doing so, exhibit a wobbling, "wounded bait", action;

A lure that will come to rest on the bottom in semi-buoyant mode so that the front-end rests on the bottom while the rear-end with attached hook will remain well off the bottom;

A lure that can be fished at any depth by first allowing the lure to dive vertically to the desired operating depth before retrieving by reeling in the line; and A lure that, after diving and coming in contact with the bottom, can be retrieved in a bottom, bumping mode without having the hooks snag on the bottom.

Briefly, the disclosed invention accomplishes the foregoing by incorporating a high overall specific gravity in the lure, a unique bouyant body configuration functioning in combination with a novel compound-curved, specifically weighted frontal section.

DESCRIPTION OF THE PREFERRED EMBODIMENTS

Figure 1:
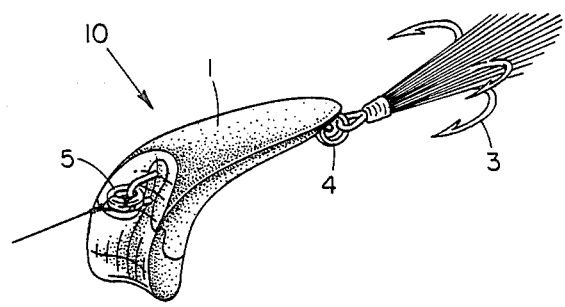
FIG. 1 is an isometric view of the lure 10 in its general retrieval position.

Referring to FIGS. 1, 2b, 3a, 3b, 3c and 4, the lure 10 consists of six principal parts:

Part 1, the buoyant "body" of the lure body that can conveniently be made of wood, hollow injection molded plastic or foamed plastic.

Part 2, the heavy lower portion of the frontal section, which we will call the "weighted lip". This weighted lip can conveniently be cast of low melting point metals such as lead, tin type or other high specific gravity metal.

Part 3, a conventional treble fishhook with a filament or hair tied around its shank.

Part 4, a conventional split-eye ring to connect the treble hook to Part 6b.

Part 5, a split-eye ring to which the fishing line is attached and whose other end is connected to Part 6a.

Part 6, a through-wire, with bent eyes 6a and 6b at each end, that passes through the main body of the lure connecting Part 5 with Part 4.

With reference to FIGS. 3a, 3b, 3c and 4, the main lure body 10 consists of the weighted lip 2 contiguous with the buoyant body 1. The overall combined lure has a negative buoyancy and high specific gravity, and will dive head-first at the rate of approximately 2 feet per second in a stable vertical path. The weighted lip of the frontal section contains approximately 80 percent of the lure's total weight. The lure's center of gravity in air CGA, is as noted in FIGS. 3a, 3c and 5. The center of gravity in water CGW is located as indicated in FIG. 5 due to the buoyancy of the body 1.

Figure 3C:
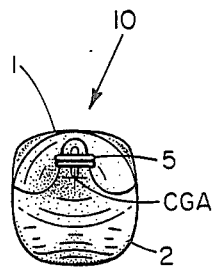
FIG. 3a, 3b and 3c show the side, top and front views of the lure.
Figure 3A:
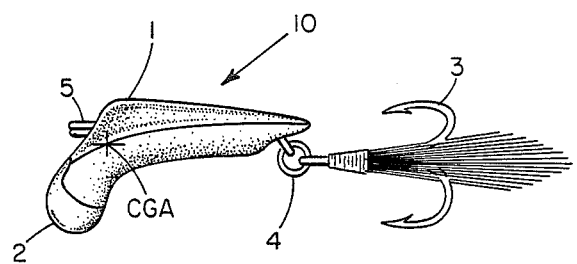
Figure 3B:
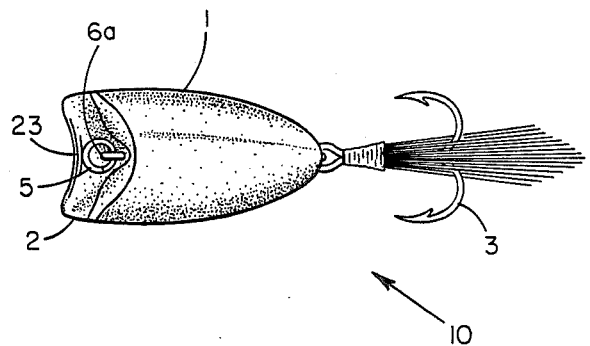

FIG. 3b shows, in the horizontal plane, the frontal section's overall concavity 23. When the lure is either in the reeling-in or diving mode, the concave face of the frontal surface 23 reacts to the water's force and generates the lure's forementioned wobbling movements.

Figure 4:
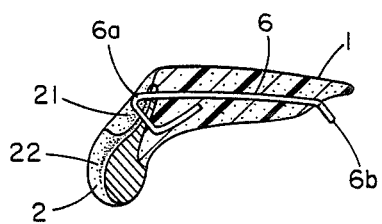
FIG. 4 is a longitudinal-vertical cross section view of the non-buoyant metal frontal lip section contiguous with the buoyant main body.

Referring to FIG. 4, the weighted lip 2 is detailed and shows its relationship to [with]the [main]buoyant body 1 in providing the necessary weight distribution and critical compound curved frontal surface of the lure. This cross section shows the spherical concave section 21 and the convex lip section 22 of the overall frontal surface of the lure. When the lure is diving without line tension, the compound surfaces 21 and 22 react to the water flow to generate forces that stabilize the lure's vertical descent.

Figure 5:
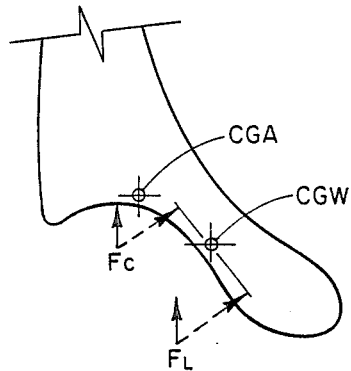
FIG. 5 is an enlarged cut-away of the frontal section showing the force of the water acting upon its surface as the lure falls by its own weight in the vertical diving position.

FIG. 5 indicates the water force Fc reacting to the concavity and the water force F reacting to the convex angular lip portions of the frontal section to stabilize the lure's descent while diving unaided vertically. When the lure enters the water, the center of gravity in water CGW is located as noted due to the vertical upward force applied by the buoyant body 1. The counter-clockwise water force $F_L$ on the angular lip of the diving surface and the clockwise water force Fc on the concavity of the diving surface have moments around CGW that counterbalance one another, and the lure dives without the frontal section being forced outside the vertical line of descent.

Figure 2A:
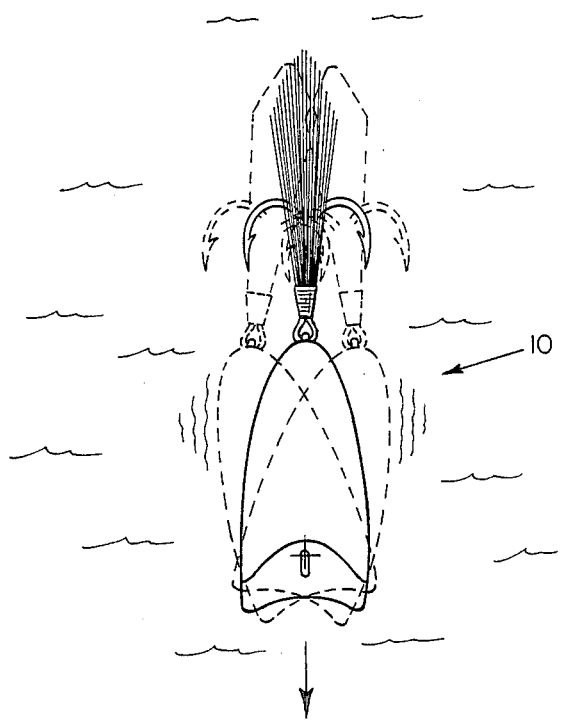
FIG. 2a depicts the lure falling vertically and indicates its side to side wobble about a frontal section axis.
Figure 2B:
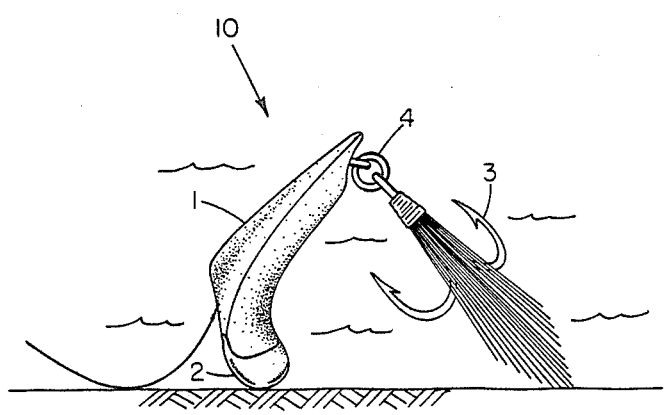
FIG. 2b depicts the lure as it rests on the bottom with the hook in a position well off said botton.

As the lure contacts the bottom it is so balanced that the weighted lip 2 rests on the bottom while the buoyant body 1 holds the hook off the bottom, FIG. 2b.

I claim:
1. A diving plug fishing lure comprising:
   A. a buoyant main body means;
   B. a compound curved frontal section means, and integral weighted lip means, of said main body means, so that said lure descends stably, unaided, vertically, without line tension and so that the force of water reacting with said compound curved frontal section means causes said lure to wobble in a longitudinal, horizontal plane while descending vertically; and
   C. hook means attached to said main body means.
2. The diving plug fishing lure of claim 1 wherein said compound curved frontal section means and integral weighted lip means comprises:
   A. a concave section of said frontal section means that reacts with said water during descent creating a clockwise force moment, in the longitudinal vertical plane, about a center of gravity;
   B. a convex section, of said lip means, integral with said concave section; and
   C. said convex section forming a weighted lip section that reacts with said water during descent creating a counterclockwise force moment about said center of gravity so that said clockwise and said counterclockwise moments are balanced and said descent is stable and maintained about a vertical plane without line tension.
3. A diving plug fishing lure comprising:
   A. a buoyant main body means;
   B. a compound curved frontal section means, and attached weighted lip means, of said main body means, so that said lure descends stably, unaided, vertically, and without line tension and so that the force of water reacting with said compound curved frontal section means causes said lure to wobble in a longitudinal, horizontal plane while descending vertically;
   C. hook means attached to said main body means;
   D. a concave section of said frontal section means that reacts with said water during descent creating a clockwise force moment, in the longitudinal vertical plane, about the center of gravity;
   E. a convex section, of said lip means, integral with said concave section; and
   F. said convex section forming a weighted lip section that reacts with said water during descent creating a counterclockwise force moment about said center of gravity so that said clockwise and said counterclockwise moments are balanced and said descent is stable and maintained about a vertical plane without line tension.

4. A method of providing a diving plug fishing lure comprising the steps of:
   A. providing a buoyant main body means;
   B. constructing a compound curved frontal section means with integral weighted lip means of said main body means so that said lure descends stably, unaided, vertically, without line tension and so that the force of water reacting with said compound curved frontal section means causes said lure to wobble in a longitudinal, horizontal plane while descending vertically; and
   C. attaching hook means to said main body means.
5. The diving plug fishing lure method of claim 4 wherein constructing said compound curved frontal section means and attached weighted lip means comprises the steps of:
   A. constructing a concave section of said frontal section means that reacts with said water during descent creating a clockwise force moment in the longitudinal vertical plane, about a center of gravity;
   B. integrally connecting a convex section, of said lip means, to said concave section; and
   C. constructing said convex section, forming a weighted lip section, that reacts with said water during descent, creating a counterclockwise force moment about said center of gravity so that said clockwise and said counterclockwise moments are balanced and said descent is stable and is maintained about a vertical plane without line tension.
6. A method of providing a diving plug fishing lure comprising the steps of:
   A. providing a buoyant main body means;
   B. constructing a compound curved frontal section means with integral weighted lip means of said main body means so that said lure descends stably, unaided, vertically, and without line tension;
   C. attaching hook means to said main body means;
   D. constructing a concave section of said frontal section means that reacts with said water during descent creating a clockwise force moment in the longitudinal vertical plane, about a center of gravity;
   E. integrally connecting a convex section, of said lip means, to said concave section; and
   F. constructing said convex section, forming a weighted lip section that reacts with said water during descent, creating a counterclockwise force moment about said center of gravity so that said clockwise and said counterclockwise moments are balanced and said descent is stable and is maintained about a vertical plane without line tension.

* * * * *